(12) United States Patent
Kondo et al.

(10) Patent No.: US 11,180,817 B2
(45) Date of Patent: Nov. 23, 2021

(54) WATER-BASED QUENCHING LIQUID COMPOSITION AND METHOD FOR MANUFACTURING METAL MATERIAL USING SAME

(71) Applicant: IDEMITSU KOSAN CO., LTD., Chiyoda-ku (JP)

(72) Inventors: Takashi Kondo, Chiba (JP); Rikki Homma, Yokohama (JP); Katsumi Ichitani, Chiba (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 165 days.

(21) Appl. No.: 16/318,416

(22) PCT Filed: Dec. 22, 2017

(86) PCT No.: PCT/JP2017/046231
§ 371 (c)(1),
(2) Date: Jan. 17, 2019

(87) PCT Pub. No.: WO2018/123904
PCT Pub. Date: Jul. 5, 2018

(65) Prior Publication Data
US 2019/0292614 A1    Sep. 26, 2019

(30) Foreign Application Priority Data
Dec. 27, 2016    (JP) .............................. JP2016-253488

(51) Int. Cl.
| | | |
|---|---|---|
| C21D 1/60 | (2006.01) | |
| C08J 3/03 | (2006.01) | |
| C08L 71/02 | (2006.01) | |
| C10M 173/00 | (2006.01) | |

(52) U.S. Cl.
CPC ................. *C21D 1/60* (2013.01); *C08J 3/03* (2013.01); *C08L 71/02* (2013.01); *C10M 173/00* (2013.01); *C08L 2201/54* (2013.01)

(58) Field of Classification Search
None
See application file for complete search history.

(56) References Cited

U.S. PATENT DOCUMENTS

| | | | |
|---|---|---|---|
| 4,151,099 A | * | 4/1979 | Nassry ................. C10M 173/02 508/250 |
| 4,770,804 A | | 9/1988 | Hentschel et al. |
| 2011/0147645 A1 | | 6/2011 | Kawasaki |
| 2017/0175030 A1 | | 6/2017 | Jibiki et al. |

FOREIGN PATENT DOCUMENTS

| | | |
|---|---|---|
| JP | 40-8247 | 4/1965 |
| JP | 62-59696 A | 3/1987 |
| JP | 4-180515 A | 6/1992 |
| JP | 2009-126975 A | 6/2009 |
| JP | 2015-71750 A | 4/2015 |
| JP | 2015-189954 A | 11/2015 |
| WO | WO 2010/021299 A1 | 2/2010 |
| WO | WO 2015/146908 A1 | 10/2015 |

OTHER PUBLICATIONS

English translation of JP 2015-071750-A (originally published Apr. 16, 2015) from Espacenet.*
Combined Chinese Office Action and Search Report dated Nov. 30, 2020 in corresponding Chinese Patent Application No. 201780044911.6 (with English Translation of Category of Cited Documents), 8 pages.
Notice of Reasons for Refusal dated Oct. 6, 2020 in Japanese Patent Application No. 2016-253488 (with English language translation), 5 pages.
International Search Report dated Mar. 27, 2018, in PCT/JP2017/046231 filed Dec. 22, 2017.
Office Action as received in the corresponding TW Patent Application No. 106145531, dated Jun. 29, 2021, Citing document AW, 3 pages.
Office Action as received in the corresponding IN patent application No. 201947002033, dated Aug. 31, 2021 w/partial English Translation, citing document AW, 5 pages.

* cited by examiner

*Primary Examiner* — George Wyszomierski
(74) *Attorney, Agent, or Firm* — Oblon, McClelland, Maier & Neustadt, L.L.P.

(57) ABSTRACT

Provided is a water-based quenching liquid composition which is slow in a cooling rate and is able to suppress quenching crack. The water-based quenching liquid composition is one containing water (A), a linear polyalkylene glycol compound (B), and a branched polyhydric alcohol alkylene oxide adduct (C), wherein the linear polyalkylene glycol compound (B) has a mass average molecular weight of 10,000 or more, and the branched polyhydric alcohol alkylene oxide adduct (C) is a mixed adduct of alkylene oxides having 2 to 3 carbon atoms and has a mass average molecular weight of 10,000 or more.

7 Claims, No Drawings

WATER-BASED QUENCHING LIQUID COMPOSITION AND METHOD FOR MANUFACTURING METAL MATERIAL USING SAME

TECHNICAL FIELD

The present invention relates to a water-based quenching liquid composition and a method of producing a metal material using the same.

BACKGROUND ART

In metal materials, such as steel materials, for the purpose of improving their properties, heat treatments, such as quenching, tempering, annealing, and normalizing, are applied. Among these heat treatments, the quenching is a treatment of dipping a heated metal material in a coolant to transform into a predetermined quenched structure, and according to this quenching, the treated material becomes very hard. For example, when a heated steel material in an austenite state is dipped in a coolant and cooled at an upper critical cooling rate or more, the steel material can be transformed into a quenched structure, such as martensite.

The coolant (quenching liquid) is in general roughly classified into an oil-based and a water-based. The water-based quenching liquid has advantages such that a cooling performance is large, an environmental load is low, and fire risk is small.

But, as for the water-based quenching liquid, since a boiling point of water is 100° C., after a steam film has been broken, a treated material is abruptly cooled to the vicinity of 100° C. That is, in the case of using the water-based quenching liquid, a cooling rate in a temperature region in which martensite is formed is fast, and therefore, a localized temperature difference or the like is generated in the treated material, so that crack (quenching crack) is liable to be generated in the treated material.

In order to improve the quenching crack, for example, a technology of PTL 1 is proposed.

CITATION LIST

Patent Literature

PTL 1: JP 4-180515 A

SUMMARY OF INVENTION

Technical Problem

PTL 1 discloses a quenching liquid additive composed of a copolymer of a polyoxyalkylene derivative having a specified structure and maleic anhydride or the like.

But, the quenching liquid additive of PTL 1 is fast in a cooling range, and therefore, it cannot satisfactorily improve the quenching crack.

In order to solve the aforementioned problem, the present invention has been made, and its problem is to provide a water-based quenching liquid composition which is slow in a cooling rate and is able to suppress quenching crack. In addition, another problem of the present invention is to provide a method of producing a metal material using the water-based quenching liquid composition.

Solution to Problem

The present invention provides a water-based quenching liquid composition and a method of producing a metal material using the water-based quenching liquid composition as mentioned in the following [1] to [2].

[1] A water-based quenching liquid composition containing water (A), a linear polyalkylene glycol compound (B), and a branched polyhydric alcohol alkylene oxide adduct (C), wherein the linear polyalkylene glycol compound (B) has a mass average molecular weight of 10,000 or more, and the branched polyhydric alcohol alkylene oxide adduct (C) is a mixed adduct of alkylene oxides having 2 to 3 carbon atoms and has a mass average molecular weight of 10,000 or more.

[2] A method of producing a metal material, including a quenching step of dipping a heated metal material in the water-based quenching liquid composition as set forth in the above [1].

Advantageous Effects of Invention

The water-based quenching liquid composition of the present invention is slow in a cooling rate and is able to suppress quenching crack. In addition, the production method of a metal material of the present invention is able to efficiently produce a metal material which is suppressed from quenching crack.

DESCRIPTION OF EMBODIMENTS

[Water-Based Quenching Liquid Composition]

The water-based quenching liquid composition of the present embodiment is one containing water (A), a linear polyalkylene glycol compound (B), and a branched polyhydric alcohol alkylene oxide adduct (C), wherein the linear polyalkylene glycol compound (B) has a mass average molecular weight of 10,000 or more, and the branched polyhydric alcohol alkylene oxide adduct (C) is a mixed adduct of alkylene oxides having 2 to 3 carbon atoms and has a mass average molecular weight of 10,000 or more.

<Water (A)>

The water-based quenching liquid composition of the present embodiment contains water (A).

In the case where the water-based quenching liquid composition does not contain the water (A), a cooling performance cannot be made satisfactory, and fire risk increases, so that safety cannot be enhanced.

The water (A) is not particularly limited, and all of distilled water, ion-exchanged water, tap water, industrial water, and so on may be used.

The content of the water (A) on a basis of the whole amount of the water-based quenching liquid composition is not particularly limited. This is because, for example, taking into considerations transportation costs or the like, the water-based quenching liquid composition is frequently marketed in a mode in which the content of water is low (mode of a concentrated liquid) and used upon being diluted in a desired concentration by a user, and therefore, the content of the water (A) is changed in a distribution process or a use process.

The content of the water (A) in the case of the mode of a concentrated liquid is not particularly limited, from the viewpoint of enhancing the safety by making a flash point low or the like, the viewpoint of transportation costs, and the viewpoint of securing the use amounts of a linear polyalkylene glycol compound (B) and a branched polyhydric alcohol alkylene oxide adduct (C) as mentioned later, the content of the water (A) is preferably 8 to 95% by mass, more preferably 20 to 80% by mass, and still more preferably 30 to 70% by mass on a basis of the whole amount of the water-based quenching liquid composition.

Although the content of the water (A) in the case of the mode of a diluted liquid is not particularly limited, from the viewpoint of enhancing the safety by making a flash point low or the like and the viewpoint of a cooling rate, the content of the water (A) is preferably 75 to 97% by mass, more preferably 80 to 95% by mass, and still more preferably 85 to 93% by mass on a basis of the whole amount of the water-based quenching liquid composition.

In this specification, it should be construed that the "cooling rate" means a cooling rate calculated from a cooling time in a temperature region of from 350° C. to 150° C., which is measured in conformity with JIS K2242:2012: Appendix A (Method B).

<Linear Polyalkylene Glycol Compound (B)>

The water-based quenching liquid composition of the present embodiment contains, as a component (B), a linear polyalkylene glycol compound having a mass average molecular weight of 10,000 or more.

In the case where the water-based quenching liquid composition does not contain the component (B), a synergistic effect due to a combination of the component (B) with a component (C) as mentioned later, namely an effect for suppressing the quenching crack by making the cooling rate slow, cannot be obtained.

Since the cooling rate can be made slow through a combination of the component (B) with the component (C), in the water-based quenching liquid composition of the present embodiment in which the component (B) is combined with the component (C), on achieving a predetermined cooling rate, it becomes possible to make a concentration of the polymer low or to use a polymer having a relatively low molecular weight. For this reason, stickiness of the water-based quenching liquid composition of the present embodiment can be suppressed, and the amount of the polymers (components (B) and (C)) to be carried away by the treated material can be reduced when a treated material was dipped into the water-based quenching liquid composition and then withdrawn. Namely, according to the water-based quenching liquid composition in which the component (B) is combined with the component (C), even by repeating the number of times of quenching, a lowering of the concentration of the polymers (components (B) and (C)) in the water-based quenching liquid composition is suppressed, whereby a change of the cooling rate can be suppressed.

A mass average molecular weight of the linear polyalkylene glycol compound (B) is preferably 10,000 or more an 100,000 or less, preferably 15,000 or more 50,000 or less, and still more preferably 17,000 or more and 30,000 or less. In the case where the mass average molecular weight of the linear polyalkylene glycol compound (B) is less than 10,000, a reduction of the cooling rate becomes unsatisfactory. In addition, by controlling the mass average molecular weight of the linear polyalkylene glycol compound (B) to 100,000 or less, not only a change of the cooling rate on repeating quenching is readily suppressed, but also handling properties are readily made favorable.

In this specification, the mass average molecular weight and the number average molecular weight each mean a value as expressed in terms of polystyrene by the gel permeation chromatography (GPC).

A ratio (Mw/Mn) of the mass average molecular weight (Mw) to the number average molecular weight (Mn) of the linear polyalkylene glycol compound (B) is preferably 1.5 to 5.0, more preferably 2.0 to 4.0, and still more preferably 2.5 to 3.5.

As the linear polyalkylene glycol compound (B), for example, a compound represented by the following general formula (I) can be preferably exemplified.

$$R^1O-(R^4O)_n-R^2 \quad (I)$$

In the formula (I), $R^4$ represents an alkylene group having 2 to 6 carbon atoms. $R^1$ and $R^2$ each independently represent a hydrogen atom, an alkyl group having 1 to 10 carbon atoms, an acyl group having 1 to 11 carbon atoms, or an optionally substituted, saturated or unsaturated alicyclic hydrocarbon group or aromatic hydrocarbon group each having 5 to 18 carbon atoms. n is a number such that the mass average molecular weight of the compound is in a range of 10,000 or more. In the case of a plurality of ($R^4O$) units exist, namely in the case of n≥2, the respective ($R^4O$) units may be the same as or different from each other. In the case where the oxyalkylene units ($R^4O$) are different, though all of a random type and a block type may be used, from the viewpoint of handling properties, a random type is preferred.

The linear polyalkylene glycol compound (B) is preferably water-soluble.

In this specification, among the compounds of the general formula (I), one in which the both terminals thereof are hydrogen is referred to as "polyalkylene glycol", whereas one in which at least one of the terminals thereof is other group than hydrogen is referred to as "polyalkylene glycol derivative". In addition, it should be construed that the linear polyalkylene glycol compound (B) is a comprehensive concept including the polyalkylene glycol and the polyalkylene glycol derivative.

As for a more specific embodiment of the linear polyalkylene glycol compound (B), examples thereof include a linear polyalkylene glycol a in which the ($R^4O$) unit of the formula (I) is constituted of one alkylene oxide, such as ethylene oxide, propylene oxide, and butylene oxide, and $R^1$ and $R^2$ are each a hydrogen atom; a linear polyalkylene glycol b in which the ($R^4O$) unit of the formula (I) is constituted of two or more alkylene oxides selected from ethylene oxide, propylene oxide, and butylene oxide, and $R^1$ and $R^2$ are each a hydrogen atom; and a linear polyalkylene glycol derivative in which at least one of terminal $R^1$ and $R^2$ in the formula (I) is any one of an alkyl group having 1 to 10 carbon atoms, an acyl group having 1 to 11 carbon atoms, and an optionally substituted, saturated or unsaturated alicyclic hydrocarbon group or aromatic hydrocarbon group each having 5 to 18 carbon atoms.

Examples of the alkyl group having 1 to 10 carbon atoms, which is represented by $R^1$ and $R^2$, include a methyl group, an ethyl group, a n-propyl group, an isopropyl group, a n-butyl group, an isobutyl group, a sec-butyl group, a tert-butyl group, a hexyl group, a 2-ethylhexyl group, a heptyl group, an octyl group, a nonyl group, and a decyl group. Examples of the acyl group having 1 to 11 carbon atoms include one having an alkyl group having 1 to 10 carbon atoms and a carbonyl group.

Examples of the saturated alicyclic hydrocarbon group having 5 to 18 carbon atoms, which is represented by $R^1$ and $R^2$, include a cyclopentyl group, a cyclohexyl group, a cycloheptyl group, a cyclooctyl group, a cyclononyl group, and a cyclodecyl group. Examples of the unsaturated alicyclic hydrocarbon group having 5 to 18 carbon atoms include a cyclopentenyl group and a cyclohexenyl group. Examples of the aromatic hydrocarbon group having 5 to 18 carbon atoms include aryl groups, such as a phenyl group and a naphthyl group.

Examples of the substituent include a $C_1$ to $C_6$ alkyl group, a $C_1$ to $C_6$ alkoxy group, and a $C_6$ to $C_{14}$ aryl group.

As for the linear polyalkylene glycol compound (B), from the viewpoints of handling properties and solubility in water, one containing ethylene oxide and propylene oxide as the ($R^4O$) unit of the formula (I) (polyoxyethylene polyoxypropylene glycol) is preferred.

In the case where the linear polyalkylene glycol compound (B) is polyoxyethylene polyoxypropylene glycol, a ratio of the number of the ethylene oxide unit (the number of an alkylene oxide unit having 2 carbon atoms) to the number of the propylene oxide unit (the number of an alkylene oxide having 3 carbon atoms) is preferably 50:50 to 95:5, more preferably 60:40 to 90:10, and still more preferably 75:25 to 85:15.

The content of the linear polyalkylene glycol compound (B) on a basis of the whole amount of the water-based quenching liquid composition is not particularly limited.

Although the content of the linear polyalkylene glycol compound (B) in the case of the mode of a concentrated liquid is not particularly limited, from the viewpoint of enhancing the safety by making a flash point low or the like and the viewpoint of securing the use amounts of the water (A) and a branched polyhydric alcohol alkylene oxide adduct (C) as mentioned later, the content of the linear polyalkylene glycol compound (B) is preferably 5 to 60% by mass, more preferably 10 to 50% by mass, and still more preferably 20 to 40% by mass on a basis of the whole amount of the water-based quenching liquid composition.

Although the content of the linear polyalkylene glycol compound (B) in the case of the mode of a diluted liquid is not particularly limited, from the viewpoint of enhancing the safety by making a flash point low or the like, the viewpoint of a cooling rate, and the viewpoint of securing the use amounts of the water (A) and a branched polyhydric alcohol alkylene oxide adduct (C) as mentioned later, the content of the linear polyalkylene glycol compound (B) is preferably 1 to 30% by mass, more preferably 3 to 20% by mass, and still more preferably 5 to 10% by mass on a basis of the whole amount of the water-based quenching liquid composition.

<Branched Polyhydric Alcohol Alkylene Oxide Adduct (C)>

The water-based quenching liquid composition of the present embodiment contains, as a component (C), a specified branched polyhydric alcohol alkylene oxide adduct. The branched polyhydric alcohol alkylene oxide adduct (C) is a branched polyhydric alcohol adducted with a mixture of alkylene oxides having 2 to 3 carbon atoms and has a mass average molecular weight of 10,000 or more.

In the case where the water-based quenching liquid composition does not contain the component (C), the aforementioned synergistic effect due to a combination of the component (B) with the component (C) cannot be obtained.

A mass average molecular weight of the branched polyhydric alcohol alkylene oxide adduct (C) is preferably 10,000 or more and 100,000 or less, preferably 12,000 or more and 50,000 or less, and still more preferably 13,000 or more and 30,000 or less. In the case where the mass average molecular weight of the branched polyhydric alcohol alkylene oxide adduct (C) is less than 10,000, a reduction of the cooling rate becomes unsatisfactory. In addition, by controlling the mass average molecular weight of the branched polyhydric alcohol alkylene oxide adduct (C) to 100,000 or less, not only a change of the cooling rate on repeating quenching is readily suppressed, but also handling properties are readily made favorable.

A ratio (Mw/Mn) of the mass average molecular weight (Mw) to the number average molecular weight (Mn) of the branched polyhydric alcohol alkylene oxide adduct (C) is preferably 1.5 to 5.0, more preferably 2.0 to 4.0, and still more preferably 2.5 to 3.5.

In the molecule of the branched polyhydric alcohol alkylene oxide adduct (C), a ratio of the number of the alkylene oxide unit having 2 carbon atoms (the number of the ethylene oxide unit) to the number of the alkylene oxide unit having 3 carbon atoms (the number of the alkylene oxide unit) is preferably 50:50 to 90:10, more preferably 60:40 to 85:15, and still more preferably 65:35 to 80:20 from the viewpoints of cooling rate and solubility in water.

Although the polyhydric alcohol that is a raw material of the branched polyhydric alcohol alkylene oxide adduct (C) is not particularly limited so long as its number of hydroxy groups is 3 or more, the number of hydroxy groups is preferably 3 to 8, more preferably 3 to 6, and still more preferably 3 to 4. In addition, as for the polyhydric alcohol that is a raw material of the branched polyhydric alcohol alkylene oxide adduct (C), its carbon number is preferably 3 to 10, more preferably 3 to 6, and still more preferably 3 to 4 from the viewpoint of solubility in water.

Specific examples of the polyhydric alcohol that is a raw material include glycerin, diglycerin, trimethylolpropane, and pentaerythritol, and of these, glycerin is preferred.

The content of the branched polyhydric alcohol alkylene oxide adduct (C) on a basis of the whole amount of the water-based quenching liquid composition is not particularly limited.

Although the content of the branched polyhydric alcohol alkylene oxide adduct (C) in the case of the mode of a concentrated liquid is not particularly limited, from the viewpoint of enhancing the safety by making a flash point low or the like and the viewpoint of securing the use amounts of the water (A) and the linear polyalkylene glycol compound (B), the content of the branched polyhydric alcohol alkylene oxide adduct (C) is preferably 5 to 50% by mass, more preferably 8 to 40% by mass, and still more preferably 10 to 30% by mass on a basis of the whole amount of the water-based quenching liquid composition.

Although the content of the branched polyhydric alcohol alkylene oxide adduct (C) in the case of the mode of a diluted liquid is not particularly limited, from the viewpoint of enhancing the safety by making a flash point low or the like, the viewpoint of a cooling rate, and the viewpoint of securing the use amounts of the water (A) and the linear polyalkylene glycol compound (B), the content of the branched polyhydric alcohol alkylene oxide adduct (C) is preferably 1 to 25% by mass, more preferably 1.5 to 15% by mass, and still more preferably 2 to 7% by mass on a basis of the whole amount of the water-based quenching liquid composition.

In the water-based quenching liquid composition of the present embodiment, a mass ratio of the linear polyalkylene glycol compound (B) to the branched polyhydric alcohol alkylene oxide adduct (C) is preferably 1:3 to 5:1.

By allowing the mass ratio of the component (B) to the component (C) to fall within the aforementioned range, the synergistic effect due to a combination of the component (B) with the component (C) can be readily exhibited. That is, by allowing the mass ratio of the component (B) to the component (C) to fall within the aforementioned range, not only the cooling rate is made slow, so that the quenching crack can be readily suppressed, but also by repeating the number of times of quenching, a change of the cooling rate can be readily suppressed.

The mass ratio of the component (B) to the component (C) is more preferably 1:1 to 4:1, and still more preferably 1:1 to 3:1.

<Additive>

The water-based quenching liquid composition of the present embodiment may contain an additive (D) within a range where the object of the present embodiment is not hindered. Examples of the additive include a lubricity improver, a metal deactivator, an anti-foaming agent, a disinfectant, a rust inhibitor, and an antioxidant. One or more of these can be used.

(Lubricity Improver)

Examples of the lubricity improver include vegetable oils, such as castor oil and rapeseed oil; and oils and fats, such as lanolin.

(Metal Deactivator)

Examples of the metal deactivator include benzotriazole, imidazoline, a pyrimidine derivative, thiadiazole, a sodium phosphate salt, and a phosphoric acid ester derivative.

(Antioxidant)

Examples of the antioxidant include amine-based antioxidants, such as an alkylated diphenylamine, phenyl-α-naphthylamine, and an alkylated phenyl-α-naphthylamine; phenol-based antioxidants, such as 2,6-di-t-butylphenol, 4,4'-methylenebis(2,6-di-t-butylphenol), isooctyl-3-(3,5-di-t-butyl-4-hydroxyphenyl) propionate, and n-octadecyl-3-(3,5-di-t-butyl-4-hydroxyphenyl) propionate; sulfur-based antioxidants, such as dilauryl-3,3'-thiodipropionate; phosphorus-based antioxidants, such as a phosphite; and molybdenum-based antioxidants.

(Antiseptic, Ant-Foaming Agent, and Rust Inhibitor)

Examples of the antiseptic include amine-based antiseptics, such as monoisopropanolamine, diisopropanolamine, triisopropanolamine, and diethanolamine; triazine-based antiseptics; alkyl benzoimidazole-based antiseptics; isothiazoline-based antiseptics; pyridine-based antiseptics; phenol-based antiseptics; and pyrithione-based antiseptics.

Examples of the anti-foaming agent include silicone-based compounds and polyether-based compounds.

Examples of the rust inhibitor include decane diacid (sebacic acid) and neodecanoic acid.

The content of the additive (D) in the water-based quenching liquid composition of the present embodiment can be properly determined in not only a range where the object of the present embodiment is not hindered but also a range where the effect of the additive (D) can be exhibited.

Although the content of the additive (D) in the case of the mode of a concentrated liquid is not particularly limited, in general, it is preferably 0.1 to 15% by mass, more preferably 0.5 to 10% by mass, and still more preferably 1 to 5% by mass on a basis of the whole amount of the water-based quenching liquid composition.

Although the content of the additive (D) in the case of the mode of a diluted liquid is not particularly limited, it is preferably 0.01 to 10% by mass, more preferably 0.05 to 5% by mass, and still more preferably 0.1 to 1% by mass on a basis of the whole amount of the water-based quenching liquid composition.

In the case of containing plural components as the additive (D), it should be construed that each of the components is contained independently in the aforementioned range.

[Method of Producing Metal Material]

A method of producing a metal material of the present embodiment includes a quenching step of dipping a heated metal material in the water-based quenching liquid composition of the present embodiment, to achieve cooling.

For example, in the case where the metal material is made of a steel, by performing a quenching step of dipping and cooling a steel heated until its metal structure becomes an austenite structure in a water-based quenching liquid composition, the metal structure of the steel is changed to a martensite structure, thereby enabling wear resistance, tensile strength, and fatigue strength to be improved.

After the quenching step, it is preferred to perform a tempering step. In the case where the metal material is made of a steel, by performing the tempering step, toughness can be improved.

EXAMPLES

Next, the present invention is described in more detail by reference to Examples, but it should be construed that the present invention is by no means limited by these Examples.

1. Measurements and Evaluations

With respect to the water-based quenching liquid compositions of the Examples and Comparative Examples, the following measurements and evaluations were performed. The results are shown in Tables 1 to 4.

1-1. Cooling Rate (New Oil)

With respect to the water-based quenching liquid compositions of Examples 1 to 4, Comparative Examples 1 to 20, and Reference Examples 1 to 2, in conformity with a cooling performance test method prescribed in JIS K2242:2012, a silver sample heated at 810° C. was put into a water-based quenching liquid composition (oil temperature: 40° C.), and a cooling curve of the silver sample was determined. A cooling rate (° C./s) on the occasion of cooling the silver sample from 350° C. to 150° C. was calculated on a basis of the cooling curve.

1-2. Cooling Rate (after Degradation Test)

With respect to the water-based quenching liquid compositions of Example 4 and Reference Examples 1 to 2, the following induction-heating degradation test was performed. With respect to the water-based quenching liquid compositions after the test, a cooling rate (° C./s) on the occasion of cooling the silver sample from 350° C. to 150° C. was calculated in the same method as in the above 1-1.

<Induction-Heating Degradation Test>

Test piece: SUS304 (φ25×50 mm)

Quenching temperature: 850° C. (induction heating at 25 kHz)

Oil amount: 400 mL

Oil temperature: 40° C.

Stirring: 200 rpm

Nitrogen blowing: 200 mL/min

Quenching time: 5 minutes

Number of times of quenching: 100 times

2. Material

The following materials were used for the water-based quenching liquid compositions of the Examples and Comparative Examples.

<Water (A)>

Ion-Exchanged Water

<Linear Polyalkylene Glycol Compound (B)>

PAG1 (polyoxyethylene polyoxypropylene glycol, Mw=19,000, Mw/Mn=2.7, (number of ethylene oxide unit)/(number of propylene oxide unit)=80/20)

PAG2 (polyoxyethylene polyoxypropylene glycol, Mw=26,000, Mw/Mn=2.6, (number of ethylene oxide unit)/(number of propylene oxide unit)=84/16)

PAG3 (polyoxyethylene polyoxypropylene glycol, Mw=27,000, Mw/Mn=3.1, (number of ethylene oxide unit)/(number of propylene oxide unit)=84/16)

PAG4 (polyoxyethylene polyoxypropylene glycol, Mw=10,000, (number of ethylene oxide unit)/(number of propylene oxide unit)=80/20)

PAG5 (polyoxyethylene polyoxypropylene glycol, Mw=10,000, (number of ethylene oxide unit)/(number of propylene oxide unit)=72/28)

<Branched Polyhydric Alcohol Alkylene Oxide Adduct (C)>

Mixed adduct of ethylene oxide and propylene oxide of glycerin, Mw=15,000, Mw/Mn=2.7, (number of ethylene oxide unit)/(number of propylene oxide unit)=72/28

<Other Branched Polyhydric Alcohol Alkylene Oxide Adduct>

Ethylene oxide adduct of glycerin (Mw=450)

Propylene oxide adduct of glycerin (Mw=330)

3. Preparation

The water-based quenching liquid compositions of Examples 1 to 4 and the water-based quenching liquid compositions of Comparative Examples 1 to 20 and Reference Examples 1 to 2 were prepared in compositions shown in Tables 1 to 4, respectively.

TABLE 1

| | | | Example 1 | Example 2 | Example 3 | Comparative Example 1 | Comparative Example 2 | Comparative Example 3 | Comparative Example 4 |
|---|---|---|---|---|---|---|---|---|---|
| Composition (mass %) | Water (A) | | 91.0 | 91.0 | 91.0 | 91.0 | 91.0 | 91.0 | 91.0 |
| | Linear polyalkylene glycol compound (B) | PAG1 | 6.0 | — | — | 9.0 | — | — | — |
| | | PAG2 | — | 6.0 | — | — | 9.0 | — | — |
| | | PAG3 | — | — | 6.0 | — | — | 9.0 | — |
| | Branched polyhydric alcohol alkylene oxide adduct (C) | | 3.0 | 3.0 | 3.0 | — | — | — | 9.0 |
| Properties | (B)/(C) | | 2:1 | 2:1 | 2:1 | — | — | — | — |
| Cooling performance | Cooling rate (new oil) (° C./s) | | 38.2 | 39.8 | 38.2 | 80.7 | 54.4 | 45.9 | 125.0 |

TABLE 2

| | | | Comparative Example 5 | Comparative Example 6 | Comparative Example 7 | Comparative Example 8 | Comparative Example 9 | Comparative Example 10 | Comparative Example 11 | Comparative Example 12 |
|---|---|---|---|---|---|---|---|---|---|---|
| Composition (mass %) | Water (A) | | 91.0 | 91.0 | 91.0 | 91.0 | 91.0 | 91.0 | 91.0 | 91.0 |
| | Linear polyalkylene glycol compound (B) | PAG1 | 6.0 | 3.0 | — | — | — | — | — | — |
| | | PAG2 | 3.0 | 6.0 | 6.0 | 3.0 | — | 6.0 | 3.0 | — |
| | | PAG3 | — | — | — | — | — | — | — | — |
| | | PAG4 | — | — | 3.0 | 6.0 | 9.0 | — | — | — |
| | | PAG5 | — | — | — | — | — | 3.0 | 6.0 | 9.0 |
| | Branched polyhydric alcohol alkylene oxide adduct (C) | | — | — | — | — | — | — | — | — |
| | Glycerin | | — | — | — | — | — | — | — | — |
| Properties | (B)/(C) | | — | — | — | — | — | — | — | — |
| Cooling performance | Cooling rate (new oil) (° C./s) | | 67.6 | 66.7 | 67.1 | 178.6 | 384.6 | 88.5 | 123.5 | 185.2 |

TABLE 3

| | | | Comparative Example 13 | Comparative Example 14 | Comparative Example 15 | Comparative Example 16 | Comparative Example 17 | Comparative Example 18 | Comparative Example 19 | Comparative Example 20 |
|---|---|---|---|---|---|---|---|---|---|---|
| Composition (mass %) | Water (A) | | 91.0 | 91.0 | 91.0 | 91.0 | 91.0 | 91.0 | 90.0 | 88.0 |
| | Linear polyalkylene glycol compound (B) | PAG1 | — | — | — | — | — | — | — | — |
| | | PAG2 | 5.0 | 3.0 | — | 6.0 | 3.0 | — | 9.0 | 9.0 |
| | | PAG3 | — | — | — | — | — | — | — | — |
| | Branched polyhydric alcohol alkylene oxide adduct (C) | | — | — | — | — | — | — | — | — |
| | Ethylene oxide adduct of glycerin | | 3.0 | 6.0 | 9.0 | — | — | — | — | — |
| | Propylene oxide adduct of glycerin | | — | — | — | 3.0 | 6.0 | 9.0 | — | — |
| | Glycerin | | — | — | — | — | — | — | 1.0 | 3.0 |

TABLE 3-continued

|  |  | Comparative Example 13 | Comparative Example 14 | Comparative Example 15 | Comparative Example 16 | Comparative Example 17 | Comparative Example 18 | Comparative Example 19 | Comparative Example 20 |
|---|---|---|---|---|---|---|---|---|---|
| Properties | (B)/(C) | — | — | — | — | — | — | — | — |
| Cooling performance | Cooling rate (new oil) (° C./s) | 111.1 | 357.1 | 500.0 | 101.0 | 303.0 | 526.3 | 53.8 | 52.9 |

TABLE 4

|  |  |  | Example 4 | Reference Example 1 | Reference Example 2 |
|---|---|---|---|---|---|
| Composition (mass %) |  | Water (A) | 86.32 | 84.32 | 88.12 |
|  | Linear polyalkylene glycol compound (B) | PAG1 | 8.40 | — | — |
|  |  | PAG2 | — | — | 10.80 |
|  |  | PAG3 | — | — | — |
|  | Branched polyhydric alcohol alkylene oxide adduct (C) |  | 4.20 | 14.60 | — |
|  |  | Sebacic acid | 0.18 | 0.18 | 0.18 |
|  |  | Diethanolamine | 0.90 | 0.90 | 0.90 |
| Properties |  | (B)/(C) | 2:1 | — | — |
| Cooling performance | Cooling rate (° C./s) | New oil (X) | 54.2 | 42.1 | 53.2 |
|  |  | After degradation test (Y) | 55.8 | 74.7 | 60.6 |
|  |  | Y − X | 1.6 | 32.6 | 7.4 |

From the results of Tables 1 to 4, the water-based quenching liquid compositions of Examples 1 to 4 are slow in the cooling rate, so that it can be confirmed that they are suitable for suppression of the quenching crack. Furthermore, from the results of Table 4, the water-based quenching liquid composition of Example 4 is small in a difference between the cooling rate of the new oil and the cooling rate after the induction-heating degradation test (number of times of quenching: 100 times), so that it can be confirmed that even repeating the quenching, they are able to maintain the cooling performance.

On the other hand, from the results of Table 1, the water-based quenching liquid compositions of Comparative Examples 1 to 4 which do not contain either one of the linear polyalkylene glycol compound (B) and the branched polyhydric alcohol alkylene oxide adduct (C) are fast in the cooling rate, so that it can be confirmed that they are not suitable for suppression of the quenching crack.

In addition, from the results of Table 2, though the water-based quenching liquid compositions of Comparative Examples 5 to 12 contain two kinds of the linear polyalkylene glycol compound (B), they do not contain the branched polyhydric alcohol alkylene oxide adduct (C), so that it can be confirmed that they are unable to make the cooling rate slow.

In addition, from the results of Table 3, though the water-based quenching liquid compositions of Comparative Examples 13 to 20 contain the linear polyalkylene glycol compound (B) and further contain the polyhydric alcohol, it can be confirmed that they are unable to make the cooling rate slow. It may be considered that this is caused due to the matters that the polyhydric alcohol of Comparative Examples 13 to 20 is not the mixed adduct of ethylene oxide and propylene oxide of glycerin; and that the molecular weight of the polyhydric alcohol is excessively low.

The water-based quenching liquid compositions of Reference Examples 1 and 2 are slower in the cooling rate in a state of the new oil than that of Example 4. This is because in the water-based quenching liquid composition of Reference Example 1, the content of the polymer is larger than that in Example 4, and in the water-based quenching liquid composition of Reference Example 2, the molecular weight of the polymer is larger than that in Example 4. Namely, the results of Tables 1 to 4 reveal that when the content of the polymer or the molecular weight of the polymer is identical, the cooling rate of the water-based quenching liquid composition containing the linear polyalkylene glycol compound (B) and the branched polyhydric alcohol alkylene oxide adduct (C) is slower than the cooling rate of the water-based quenching liquid composition which does not contain either one of the linear polyalkylene glycol compound (B) and the branched polyhydric alcohol alkylene oxide adduct (C).

INDUSTRIAL APPLICABILITY

The water-based quenching liquid composition of the present embodiment is slow in a cooling rate and is able to suppress quenching crack, and therefore, it is suitably used for a quenching step of a metal material.

The invention claimed is:

1. A water-based quenching liquid composition, comprising:
water (A),
a linear polyalkylene glycol compound (B), and
a branched polyhydric alcohol alkylene oxide adduct (C),
wherein the linear polyalkylene glycol compound (B) is polyoxyethylene polyoxypropylene glycol having a mass average molecular weight of 15,000 or more, and the branched polyhydric alcohol alkylene oxide adduct (C) is a mixed adduct of alkylene oxides having 2 to 3 carbon atoms and has a mass average molecular weight of 10,000 or more.

2. The water-based quenching liquid composition according to claim 1, wherein a mass ratio of the linear polyalkylene glycol compound (B) to the branched polyhydric alcohol alkylene oxide adduct (C) is from 1:3 to 5:1.

3. The water-based quenching liquid composition according to claim 1, wherein a mass average molecular weight of the linear polyalkylene glycol compound (B) is 15,000 or more and 100,000 or less, and a mass average molecular weight of the branched polyhydric alcohol alkylene oxide adduct (C) is 10,000 or more and 100,000 or less.

4. The water-based quenching liquid composition according to claim 1, wherein in a molecule of the linear polyalkylene glycol compound (B), a ratio of a number of alkylene oxide units having 2 carbon atoms to a number of alkylene oxide units having 3 carbon atoms is from 50:50 to 95:5.

5. The water-based quenching liquid composition according to claim 1, wherein in a molecule of the branched polyhydric alcohol alkylene oxide adduct (C), a ratio of a number of alkylene oxide units having 2 carbon atoms to a number of alkylene oxide units having 3 carbon atoms is from 50:50 to 90:10.

6. The water-based quenching liquid composition according to claim 1, wherein the polyhydric alcohol of the branched polyhydric alcohol alkylene oxide adduct (C) is glycerin.

7. A method of producing a metal material, comprising quenching a heated metal material with the water-based quenching liquid composition according to claim 1.

* * * * *